Patented June 10, 1952

2,600,100

UNITED STATES PATENT OFFICE 2,600,100

PROCESS FOR PREPARING UREA FORM-
ALDEHYDE LACQUER COMPOSITIONS

Edward Michael Evans and Reginald William
Henry Wicking, Tonbridge, England, assignors
to British Resin Products Limited, London,
England, a corporation of Great Britain and
Northern Ireland No Drawing. Application August 26, 1947, Serial
No. 770,760. In Great Britain September 4,
1946

12 Claims. (Cl. 260—33.4)

This invention relates to an improved process for the preparation of urea-formaldehyde and the like lacquer resins.

One object of the invention is to provide products which have good compatibility with solvents, oils and the like and which, when baked in film-form, yield films of exceptional hardness, mar resistance and water-resistance and freedom from that surface defect known as striation.

Another object is to effect an economy in the use of alcohol in the preparation of the lacquer with a consequent considerable saving in cost.

It has already been proposed to react urea with formaldehyde in aqueous solution in the presence of an alkaline catalyst, to dehydrate the resulting solution under vacuum, to add an acid such as phosphoric acid and an alcohol such as butanol, and to distil off the excess alcohol and water under vacuum to yield a lacquer-forming material.

It has also been proposed to produce resinous condensation products by heating urea, formaldehyde and a primary aliphatic alcohol having four carbon atoms in the molecule at an elevated temperature, removing water produced by the reaction by distillation, in the presence, if desired, of a volatile organic solvent, such as an aromatic hydrocarbon, for example, benzene or toluene, returning distillate to the reaction mixture after rejection of water from said distillate and continuing the operation until substantially 2 molecules of water for each molecule of urea have been eliminated.

Such methods involve the use of a large excess of the alcohol and some of this must be distilled off subsequently if a solution of suitable strength for use as a lacquer base is to be obtained.

According to the present invention the improved process for the preparation of lacquer compositions comprises reacting urea with formaldehyde in aqueous solution in the proportions of at least 2.7 mols of formaldehyde to 1 mol of urea in the presence of an alkaline catalyst, dehydrating the reaction mixture by heating it under reduced pressure until the major proportion of the water has been removed, thereafter acidifying the mixture and adding an alcohol and an inert solvent both of the kinds hereinafter described, in amounts not greater than will yield, as the final product and without subsequent concentration, a lacquer base of the desired strength, heating the reaction mixture under normal pressure and removing by distillation alcohol, inert solvent and entrained water, condensing the distilled vapours, separating the water from the condensate and returning the alcohol and inert solvent to the reaction mixture, until substantially complete etherification has been effected and substantially all water removed from the product.

The urea in the initial reaction mixture may be replaced in part by compounds which react with formaldehyde in a similar manner, such as thiourea, melamine and their derivatives.

Suitable alkaline catalysts include ammonium hydroxide, sodium hydroxide, potassium hydroxide and sodium carbonate.

The formaldehyde may be added as an aqueous solution or substances capable under the reaction conditions of liberating formaldehyde in aqueous solution, such as para-formaldehyde and hexamethylenetetramine, may be used.

The molar ratio of formaldehyde to urea must be at least 2.7 to 1 but a much higher proportion of formaldehyde is not necessary and would be in fact economically undesirable. In general molar ratios between 2.7 and 4 to 1 are suitable for carrying out the invention.

Heating the initial reaction mixture to a moderate temperature and stirring for a short time may in some cases assist the reaction and the formation of the desired polymethylol urea. The dehydration is effected by heating under reduced pressure and is continued until as much water as possible is removed without causing the mixture to gel. The temperature of the batch is a convenient guide and it is found that when using urea and formaldehyde removal of water by distillation may be continued until the temperature rises to about 70° C. at about 50 to 60 mm. Hg pressure.

Suitable alcohols are the monohydric aliphatic alcohols containing 4 or more carbon atoms in the molecule and simple aromatic alcohols. Examples are the several butyl, amyl, hexyl and octyl alcohols, or mixtures thereof. Where the higher aliphatic alcohols are used, it may be advantageous to add a minor proportion of a lower monohydric aliphatic alcohol, such as methanol, ethanol, normal or isopropanol, to facilitate distillation, water removal and consequent etherification.

By the expression, "water-entraining inert solvent," there is meant any solvent which is inert with respect to the constituents of the reaction mixture, but which on distillation will entrain water and the alcohol to yield two layers in the condensate, one of which layers is mainly water. Examples of suitable solvents are benzene, toluene and xylene.

The water-entraining inert solvent may be added at the same time as the alcohol and acid at the end of the initial dehydration, but alternatively, it may be added after the alcohol and acid have been refluxed with the reaction mixture for a short time. Also, the inert solvent may be added in a number of successive portions. The amounts of alcohol and water-entraining inert solvent added during the process should preferably be approximately those which are required for the final product without further dilution. The amounts are in any case not so great that subsequent concentration is required.

In this way the process according to the present invention differs in a marked manner from processes already known in which it is necessary, in order to effect etherification, to use an amount of alcohol considerably in excess of that eventually required in the finished product. These prior processes entailed the trouble and expense of the subsequent removal of the excess alcohol which, furthermore, is most likely to require purification before it can be used again for this or for other purposes.

Among the acid catalysts which may be used for the etherification stage, there may be mentioned, for example, phthalic anhydride, oxalic acid, sulphuric acid and phosphoric acid.

Other resins or resin forming substances may if desired be added during the etherification stage, thereby producing modified resins with particularly desirable properties for some purposes. Specially suitable resins are those of the polybasic acid-polyhydric alcohol type, also commonly referred to as alkyd resins.

The reaction is preferably carried out in the presence of an inert gas, such as nitrogen. This may be conveniently effected by, for example, bubbling a stream of nitrogen or other inert gas, through the reaction mixture throughout the course of the reaction.

The manner in which the invention may be carried into effect is illustrated by the following examples in which the parts and percentages are by weight.

EXAMPLE 1

131 parts of urea, 600 parts of aqueous formaldehyde containing 37% formaldehyde and 30 parts of aqueous ammonia containing 26% ammonia, calculated as $NH_3$, were mixed together and heated with stirring during 15 minutes to a temperature of 60° C. The temperature of the batch was maintained at 60° C. during 30 minutes. The reaction mass was then subjected to distillation with stirring at a pressure of approximately 50–60 mm. Hg until the temperature of the batch rose to 70° C. There resulted approximately 340 parts of an aqueous polymethylol urea syrup. The pressure in the reaction vessel was restored to that of the atmosphere and 230 parts of normal butyl alcohol, followed by 5 parts of phthalic anhydride, were added. The mass was heated to reflux and maintained in this condition for 30 minutes. 40 parts of xylene were then added and the reaction mass was then heated to a temperature at which distillation readily took place, the distillate being cooled, the water separated therefrom and the solvent (upper layer) returned continuously to the batch. Distillation commenced at a temperature of 94° C. (internal batch temperature). Distillation was continued until the temperature of the reaction mass rose to 105° C. corresponding with the removal of 60 parts of water from the batch. A further 40 parts of xylene were then added and distillation continued until the temperature of the batch rose to 130°–135° C. At this stage, a total quantity of water corresponding to 120 parts had been distilled from the batch, leaving 535 parts of a liquid resinous material possessing the following characteristics:

Appearance: Clear, substantially colourless.
Specific gravity (15°/15° C.): 1.050.
Viscosity: (25° C.): 9 poises.
Solids content: 60% (as determined at 105° C. for 2 hours).
White spirit tolerance: 44 cc. white spirit per 10 g. product.
Compatibility with blown linseed oil: Excellent.
Solubility in xylene: Infinite.
Properties of film baked at 130° C. for ½ hour:
  Excellent colour, clarity, hardness and gloss.
  Completely free from striation.

The product obtained according to this example is suitable for use as a base for clear or pigmented lacquers either alone or in conjunction with other resinous or lacquer-forming materials.

EXAMPLE 2

| | Parts |
|---|---|
| Melamine | 13 |
| Urea | 118 |
| 37% W/W formalin solution | 546 |
| Hexamethylene tetramine | 16 | were mixed in a flask arranged for distillation under vacuum, and heated with stirring until the temperature in the flask rose to 70° C. under a vacuum of 50–60 mm. of mercury. Water was removed and a viscous syrup consisting mainly of polymethylol urea and the corresponding melamine compound remained.

255 parts of normal butanol and 5 parts of phthalic anhydride were then added and the mixture refluxed for 15 minutes, then 80 parts of xylene were added and distillation effected as in the previous examples until the final temperature in the batch was 133° C., the water being separated and solvent returned to the batch. 520 parts of a yellow, slightly cloudy viscous liquid were thus obtained.

EXAMPLE 3

| | Parts |
|---|---|
| Urea | 131 |
| 37% W/W formalin solution | 546 |
| Hexamine | 16 | were mixed and dehydrated under vacuum to 70° C. as in the previous Example 2, then 350 parts of a commercial quality of octyl alcohol containing about 60% ethyl hexanol, 200 parts methanol and 5 parts of phthalic anhydride added, and the mixture refluxed for 15 minutes. 100 parts of a water and methanol mixture were then distilled off, 40 parts of xylene added, and water removed by distillation as in the previous examples until the temperature in the batch rose to 115° C.; a further 40 parts of xylene were then added and water removal continued until the batch temperature rose to 163° C. Solvent distilling over with the water was returned to the batch after separation from the water. This yielded 630 parts of a slightly cloudy yellow viscous liquid.

EXAMPLE 4

| | Parts |
|---|---|
| Urea | 131 |
| 37% formalin solution | 600 |
| 26% ammonia solution | 30 | were mixed and dehydrated under vacuum to 70° C. as in the previous Examples 3 and 2. 235 parts of butanol and 10 parts of 10% phosphoric acid were added and the mixture refluxed for 15 minutes. 40 parts of xylene were then added and water removed by distillation and separation from entrained solvent until the temperature rose to 130° C., and no more water was distilled off, the separated solvent being returned to the batch. The remaining 40 parts of xylene were then added. The product was water white but slightly misty.

EXAMPLE 5

|   | Parts |
|---|---|
| Urea | 131 |
| 37% formalin solution | 600 |
| 26% ammonia solution | 30 | were mixed and dehydrated under vacuum to 70° C. as in the previous Examples 3–4. 235 parts of butanol and 0.1 part ammonium chloride were added and the mixture refluxed for 15 minutes. 40 parts of xylene were then added and water removed by distillation and separation from entrained solvent until the temperature rose to 130° C., the separated solvent being returned to the batch. Then the remaining 40 parts of xylene were added. The product was starbright and very slightly pink in colour.

EXAMPLE 6

(A) *Glycerol adipate intermediate*

804 parts of adipic acid and 600 parts of glycerol were mixed, and heated in a flask fitted with a stirrer and distillation condenser. During heating the temperature rose from 140° C. to 210° C. as water was eliminated: the acid value fell to 30–35 mg./grm. and 180 parts of water were collected in the receiver. The resin was then thinned with a mixture of 1053 parts of butanol and 380 parts of xylene. The yield was approximately 2270 parts.

(B)

|   | Parts |
|---|---|
| Urea | 131 |
| 37% formalin solution | 600 |
| 26% ammonia solution | 30 | were mixed and dehydrated under vacuum to 70° C. as in the previous Examples 2–5, then 235 parts of butanol and 5 parts of phthalic anydride were added, and the mixture refluxed for 15 minutes. 455 parts of the intermediate "A" were then added and the mixture heated for removal of water as before until the temperature had risen to 128° C., and no more water was being evolved. The product was a yellow viscous liquid suitable for use as a base for lacquers and insulating material, yielding films of excellent flexibility, extensibility and hardness.

In the above Examples 1, 3 to 6, part of the urea may be replaced by equivalent proportions of thiourea or melamine or their derivatives which react with formaldehyde in a similar manner to urea. The formalin solution may be replaced by the equivalent proportions of substances such as paraformaldehyde which liberate formaldehyde under the reaction conditions. Similarly, the alkaline catalyst may be replaced by equivalent proportions of sodium hydroxide, potassium hydroxide, sodium carbonate or the like and instead of the alcohols named similar proportions of other alcohols of the kinds described may be used. Again instead of the xylene similar proportions of other water-entraining inert solvents such as benzene or toluene may be used.

We claim:
1. The process for the preparation of a lacquer base comprising mixing together aqueous ammonia, urea, and aqueous formaldehyde solution in proportions such that the ratio of ammonia to urea to formaldehyde to water by weight is:

1 : about 17 : 27–30 : 45–53 heating the mixture under a pressure of about 50–60 mm. Hg to remove water by distillation until the temperature of the mixture rises to 70° C. adding about 1.5 parts of phthalic anhydride, 24 parts of xylene and 68 parts of butanol to every 100 parts by weight of syrup, and heating to effect etherification and distil off water until the temperature of the batch rises to 120–135° C., the alcohol and solvent distilling over with the water being separated therefrom and returned to the reaction mixture.

2. A process as claimed in claim 1 wherein the xylene is added in two successive portions during the second dehydration stage.

3. A process as claimed in claim 1 wherein the 1.5 parts of phthalic anhydride are replaced by about 0.3 part by weight of phosphoric acid.

4. A process for the production of lacquer compositions which comprises, reacting urea with formaldehyde in aqueous solution in the proportion of between 2.7–4 mols of formaldehyde to 1 mol of urea in the presence of an alkaline catalyst to produce a reaction product, removing water, acidifying the mixture, adding an alcohol selected from the group consisting of butyl, amyl, hexyl, and octyl alcohols in amount not substantially in excess of the theoretical quantity required to react with the methylol groups of the polymethylol urea formed, adding a water-entraining inert diluent, heating the mixture to produce etherification, and removing the water by distillation with said entrainer and alcohol while returning the separated entrainer and alcohol to the mass undergoing etherification, the addition of said alcohol and inert diluent being adjusted to leave a lacquer base when removal of the water has been completed.

5. A process as set forth in claim 4, wherein the urea is replaced in part by an equivalent amount of a compound selected from the group consisting of thio-urea and melamine.

6. A process as set forth in claim 4, wherein the formeldehyde is provided by the deposition in situ of a compound selected from the group consisting of paraformaldehyde and hexamethylene tetramine.

7. A process as set forth in claim 4, wherein the weight ratio of the reaction mixture during etherification, to the alcohol, to the water-entraining inert diluent is about 100:66:16–24.

8. In a process as set forth in claim 4, the step of incorporating an alkanol of one to three carbon atoms in the reaction mixture undergoing etherification.

9. A process as set forth in claim 4, wherein the water-entraining inert diluent is added to the reaction mixture undergoing etherification in a number of successive operations.

10. In a process as set forth in claim 4, the step of adding an alkyd resin to the reaction mixture undergoing etherification in an amount less than the weight of urea formaldehyde resin formed as the reaction product.

11. In a process as set forth in claim 4, the step of adding alkyd resin-forming compounds to the reaction mixture undergoing etherification in an amount less than the weight of urea formaldehyde resin formed as the reaction product.

12. The process as claimed in claim 1, wherein, instead of the xylene, 135 parts of glyceryl adipate solution obtained by reacting adipic acid and glycerol at from 140°–210° C. while removing water by distillation, and diluting with butanol and at least 24 parts of xylene, are added to every 100 parts of the urea formaldehyde syrup, heating being continued to about 128° C. to effect etherification and water removal.

EDWARD MICHAEL EVANS.
REGINALD WILLIAM HENRY WICKING.

REFERENCES CITED

The following references are of record in the file of this patent:

UNITED STATES PATENTS

| Number | Name | Date |
|---|---|---|
| 2,191,957 | Edgar et al. | Feb. 27, 1940 |
| 2,524,472 | Parker | Oct. 3, 1950 |

OTHER REFERENCES

Kline, Plastics and Resins, Aug. 1946, page 15.